(12) United States Patent
Zi et al.

(10) Patent No.: US 11,132,961 B2
(45) Date of Patent: Sep. 28, 2021

(54) BACKLIGHT DRIVING CIRCUIT, METHOD AND DEVICE, STORAGE MEDIUM AND DISPLAY DEVICE

(71) Applicants: Beijing BOE Optoelectronics Technology Co., Ltd., Beijing (CN); BOE Technology Group Co., Ltd., Beijing (CN)

(72) Inventors: Feng Zi, Beijing (CN); Jian Sun, Beijing (CN); Ziqiang Guo, Beijing (CN); Xinjian Liu, Beijing (CN); Feng Pan, Beijing (CN); Yakun Wang, Beijing (CN); Jiyang Shao, Beijing (CN); Binhua Sun, Beijing (CN); Hao Zhang, Beijing (CN); Lili Chen, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/650,451

(22) PCT Filed: May 16, 2019

(86) PCT No.: PCT/CN2019/087250
§ 371 (c)(1),
(2) Date: Mar. 25, 2020

(87) PCT Pub. No.: WO2019/223602
PCT Pub. Date: Nov. 28, 2019

(65) Prior Publication Data
US 2020/0234660 A1    Jul. 23, 2020

(30) Foreign Application Priority Data
May 25, 2018  (CN) .......................... 201810545603.8

(51) Int. Cl.
G09G 3/34 (2006.01)
H05B 45/20 (2020.01)
(Continued)

(52) U.S. Cl.
CPC ..... G09G 3/3426 (2013.01); G02F 1/133603 (2013.01); H05B 45/10 (2020.01); H05B 45/20 (2020.01); G09G 2320/064 (2013.01)

(58) Field of Classification Search
CPC .......... G09G 3/3426; G09G 2320/064; G09G 2320/0646; H05B 45/20; H05B 45/10;
(Continued)

(56) References Cited

U.S. PATENT DOCUMENTS 9,271,356 B2 *  2/2016  Li ..................... H05B 45/46
10,973,098 B1 *  4/2021  Chen .................. H05B 45/30
(Continued)

FOREIGN PATENT DOCUMENTS

CN    101013559 A    8/2007
CN    101547539 A    9/2009
(Continued)

OTHER PUBLICATIONS

International search report of PCT application No. PCT/CN2019/087250 dated Aug. 21, 2019.
(Continued)

Primary Examiner — Grant Sitta
(74) Attorney, Agent, or Firm — Fay Sharpe LLP

(57) ABSTRACT

A backlight driving circuit of driving a backlight source, the backlight source comprising a plurality of LEDs arranged in an array, the backlight driving circuit comprising: a power source sub-circuit and a switch control sub-circuit, wherein the power source sub-circuit is electrically connected to the plurality of LEDs respectively through the switch control sub-circuit; and the switch control sub-circuit is configured
(Continued)

to determine a to-be-turned-on LED and a to-be-turned-off LED according to color information of an image to be displayed, and control each of the LEDs to be turned on or off by controlling a connection state between each of the LEDs and the power source sub-circuit separately according to the determined to-be-turned-on LED and the determined to-be-turned-off LED. A backlight driving method, a backlight driving device and a computer-readable storage medium are further provided.

17 Claims, 8 Drawing Sheets

(51) Int. Cl.
　　　*H05B 45/10*　　　(2020.01)
　　　*G02F 1/13357*　　(2006.01)
(58) Field of Classification Search
　　　CPC ... H05B 45/44; H05B 45/00; G02F 1/133603; Y02B 20/30
　　　See application file for complete search history.

(56) References Cited

U.S. PATENT DOCUMENTS

| | | | |
|---|---|---|---|
| 2004/0042234 A1* | 3/2004 | Otake | H05B 45/20 362/561 |
| 2007/0171271 A1 | 7/2007 | Wey et al. | |
| 2007/0222391 A1* | 9/2007 | Lee | H05B 45/46 315/82 |
| 2008/0116818 A1* | 5/2008 | Shteynberg | H05B 45/24 315/192 |
| 2008/0180461 A1 | 7/2008 | Ma | |
| 2009/0322235 A1* | 12/2009 | Shiu | H05B 45/46 315/185 R |
| 2010/0123743 A1* | 5/2010 | Chang | G09G 3/3413 345/690 |
| 2011/0037790 A1* | 2/2011 | Onishi | G09G 3/342 345/690 |
| 2011/0080432 A1* | 4/2011 | Nakazawa | G09G 3/3426 345/690 |
| 2011/0227503 A1* | 9/2011 | Yuan | H05B 45/46 315/294 |
| 2013/0278155 A1 | 10/2013 | Pang et al. | |
| 2017/0047020 A1* | 2/2017 | Yata | G09G 3/3413 |
| 2019/0108798 A1* | 4/2019 | Ishihara | G09G 3/3413 |

FOREIGN PATENT DOCUMENTS

| | | |
|---|---|---|
| CN | 101697270 A | 4/2010 |
| CN | 201748359 U | 2/2011 |
| CN | 102646402 A | 8/2012 |
| CN | 103150998 A | 6/2013 |
| CN | 104332140 A | 2/2015 |
| CN | 104575383 A | 4/2015 |
| CN | 105047145 A | 11/2015 |
| CN | 105096840 A | 11/2015 |
| CN | 205722747 U | 11/2016 |
| CN | 107767822 A | 3/2018 |
| CN | 108538259 A | 9/2018 |

OTHER PUBLICATIONS

First office action of Chinese application No. 201810545603.8 dated Jul. 17, 2019.

Second office action of Chinese application No. 201810545603.8 dated Jan. 15, 2020.

* cited by examiner

US 11,132,961 B2

BACKLIGHT DRIVING CIRCUIT, METHOD AND DEVICE, STORAGE MEDIUM AND DISPLAY DEVICE

This application is a 371 of PCT/CN2019/087250, filed on May 16, 2019, which claims priority to Chinese Patent Application No. 201810545603.8, filed on May 25, 2018 and entitled "Backlight Driving Circuit, Backlight Driving Method, and Display Device", the entire contents of which are incorporated herein by reference.

TECHNICAL FIELD

The present disclosure relates to a backlight driving circuit, a backlight driving method and a backlight driving device, a storage medium and a display device.

BACKGROUND

In the field of display technology, a liquid crystal display (LCD) panel needs a light source generated by a backlight source behind the panel to display an image as the LCD panel cannot generate the light source by itself. Since a light emitting diode (LED) can improve the color rendering ability of the panel and is relatively environment-friendly, and most LCDs use LEDs as their backlight sources.

SUMMARY

Embodiments of the present disclosure provide a backlight driving circuit, method and device, a storage medium and a display device. The technical solutions are as follows:

At least one embodiment of the present disclosure provides a backlight driving circuit of driving a backlight source, the backlight source comprising a plurality of LEDs arranged in an array, the backlight driving circuit comprising: a power source sub-circuit and a switch control sub-circuit, wherein the power source sub-circuit is electrically connected to the plurality of LEDs respectively through the switch control sub-circuit; and the switch control sub-circuit is configured to determine a to-be-turned-on LED and a to-be-turned-off LED according to color information of an image to be displayed, and control each of the plurality of LEDs to be turned on or off by controlling a connection state between the LED and the power source sub-circuit separately according to the determined to-be-turned-on LED and the determined to-be-turned-off LED.

Optionally, the switch control sub-circuit includes a switch controller and a switch array.

The switch array includes a plurality of switches corresponding to the plurality of LEDs in one-to-one correspondence; one end of each of the plurality of switches is electrically connected to a positive electrode of the power source sub-circuit, and the other end of the switch is electrically connected to a positive electrode of the LED that the switch corresponds to; and a negative electrode of each of the plurality of LEDs is electrically connected to a negative electrode of the power source sub-circuit.

The switch controller is configured to be electrically connected to a control end of each of the switches, respectively.

Optionally, the power source sub-circuit includes a power supply sub-circuit and a constant electric current control sub-circuit.

The power supply sub-circuit is configured to convert an external voltage provided by the external power source into a voltage required by the LEDs;

The constant electric current control sub-circuit is configured to generate an electric current based on the voltage output by the power supply sub-circuit, and perform constant electric current driving on the turned-on LED.

Optionally, the switch control sub-circuit is configured to determine a first region with brightness value no less than a preset brightness value and a second region with brightness value less than the preset brightness value in the image to be displayed according to the color information of the image to be displayed; all the LEDs are divided into at least one lamp groups according to the first region and the second region, and each lamp group comprises at least one LED and corresponds to one of the first region and the second region in the image to be displayed; when the lamp group corresponds to the first region, the switch control sub-circuit is configured to control the LEDs in the lamp group are controlled to be turned on simultaneously; and when the lamp group corresponds to the second region, the switch control sub-circuit is configured to control the LEDs in the lamp group to be turned off simultaneously.

Optionally, the image to be displayed is a dynamic image comprising a continuous multi-frame image; and the switch control sub-circuit is further configured to determine a light emission quantity of the to-be-turned-on LED in a display time period of the continuous multi-frame image according to color information of the continuous multi-frame image, and control the to-be-turned-on LED to emit light according to the light emission quantity.

Optionally, the switch control sub-circuit is configured to determine a turning-on duration of the to-be-turned-on LED according to the color information of the continuous multi-frame image, the turning-on duration being configured to define the light emission quantity of the to-be-turned-on LED in the display time period of the continuous multi-frame image; and control the to-be-turned-on LED to be turned on according to the turning-on duration of the LED.

Optionally, the switch control sub-circuit is configured to determine a brightness value of each region in the continuous multi-frame image according to the color information of the continuous multi-frame image, each region corresponding to at least one of the LEDs; and determine a turning-on duration of the LED corresponding to each region according to a set relationship between a brightness value of region and a turning-on durations of the LEDs.

Optionally, the power source sub-circuit is configured to provide electric currents of different magnitudes in time division in the display time period of the continuous multi-frame image; and the switch control sub-circuit is configured to determine an electric current used in turning on of the to-be-turned-on LED according to the color information of the continuous multi-frame image, the electric current used in turning on being configured to define the light emission quantity of the to-be-turned-on LED in the display time period of the continuous multi-frame image; and control the LED that uses an electric current corresponding to the determined electric current in a magnitude during turning on to be turned on when the power source sub-circuit outputs the electric currents of the different magnitudes.

Optionally, the switch control sub-circuit is configured to determine a brightness value of each region in the continuous multi-frame image according to the color information of the image to be displayed, each of the regions being corresponding to at least one of the LEDs; and determine a turning-on electric current of the LED corresponding to each region according to a set relationship between a brightness value of region and turning-on electric currents of the LEDs.

At least one embodiment of the present disclosure provides a display device, comprising the backlight driving circuit as mention before.

At least one embodiment of the present disclosure provides a backlight driving method of driving a backlight source, the backlight source comprising a plurality of light emitting diode (LED) lamps arranged in an array, wherein the backlight driving method is performed based on a backlight driving circuit comprising a power source sub-circuit and a switch control sub-circuit; the power source sub-circuit is electrically connected to the plurality of LEDs respectively through the switch control sub-circuit; and the backlight driving method comprises:

determining a to-be-turned-on LED and a to-be-turned-off LED according to color information of an image to be displayed;

controlling each of the LEDs to be turned on or off by controlling a connection state between the LED and the power source sub-circuit separately by the switch control sub-circuit, according to the determined to-be-turned-on LED and the to-be-turned-off LED.

Optionally, controlling the connection state between each LED and the power source sub-circuit separately by the switch control sub-circuit comprises:

determining a to-be-turned-on LED and a to-be-turned-off LED according to color information of an image to be displayed; and controlling each LED to be turned on or off according to the determined to-be-turned-on LED and the to-be-turned-off LED.

Optionally, determining the to-be-turned-on LED and the to-be-turned-off LED according to the color information of the image to be displayed comprises:

determining a first region with brightness value no less than a preset brightness value and a second region with brightness value less than the preset brightness value in the image to be displayed according to the color information of the image to be displayed;

dividing all the LEDs into at least one lamp groups according to the first region and the second region, each lamp group comprising at least one LED and corresponding to one of the first region and the second region in the image to be displayed; and when the lamp group corresponds to the first region, controlling the LEDs in the lamp group to be turned on simultaneously, and when the lamp group corresponds to the second region, controlling the LEDs in the lamp group to be turned off simultaneously.

Optionally, the image to be displayed is a dynamic image comprising a continuous multi-frame image; and the method further comprises:

determining a light emission quantity of the to-be-turned-on LED in a display time period of the continuous multi-frame image according to color information of the continuous multi-frame image, and controlling the to-be-turned-on LED to emit light according to the light emission quantity.

Optionally, determining the light emission quantity of the to-be-turned-on LED in the display time period of the continuous multi-frame image according to the color information of the continuous multi-frame image comprises:

determining a turning-on duration of the to-be-turned-on LED according to the color information of the continuous multi-frame image, the turning-on duration being configured to define the light emission quantity of the to-be-turned-on LED in the display time period of the continuous multi-frame image; and controlling the to-be-turned-on LED to emit light according to the light emission quantity comprises:

controlling the to-be-turned-on LED to be turned on according to the turning-on duration of the LED.

Optionally, determining the turning-on duration of the to-be-turned-on LED according to the color information of the continuous multi-frame image comprises:

determining a brightness value of each region in the continuous multi-frame image according to the color information of the continuous multi-frame image, each region corresponding to at least one of the LEDs; and determining a turning-on duration of the LED corresponding to each region according to a set relationship between a brightness value of region and a turning-on durations of the LED.

Optionally, the power source sub-circuit is configured to provide electric currents of different magnitudes in time division in the display time period of the continuous multi-frame image;

determining the light emission quantity of the to-be-turned-on LED in the display time period of the continuous multi-frame image according to the color information of the continuous multi-frame image comprises:

determining an electric current used in turning on of the to-be-turned-on LED according to the color information of the continuous multi-frame image, the electric current used in turning on being configured to define the light emission quantity of the to-be-turned-on LED in the display time period of the continuous multi-frame image; and controlling the to-be-turned-on LED to emit light according to the light emission quantity comprises:

controlling the LED that uses an electric current corresponding to the determined electric current in a magnitude during turning on to be turned on when the power source sub-circuit outputs the electric currents of the different magnitudes.

Optionally, determining the electric current used in turning on of the to-be-turned-on LED according to the color information of the continuous multi-frame image comprises:

determining a brightness value of each region in the continuous multi-frame image according to the color information of the image to be displayed, each region corresponding to at least one LED; and determining a turning-on electric current of the LED corresponding to each region according to a set relationship between a brightness value of region and a turning-on electric currents of the LED.

At least one embodiment of the present disclosure provides a backlight driving device comprising: a processor; and a memory configured to store instructions executable by the processor, wherein the processor is configured to execute the backlight driving method as described above.

At least one embodiment of the present disclosure provides a computer-readable storage medium, wherein when instructions in the computer-readable storage medium are executed by a processor of a backlight driving device, the backlight driving device is configured to perform the backlight driving method as described above.

DETAILED DESCRIPTION

In order to describe the principles, technical solutions and advantages in the embodiments of the present disclosure more clearly, the present disclosure will be described in detail below in combination with the accompanying drawings. Apparently, the described embodiments are merely some embodiments, rather than all embodiments, of the present disclosure. Based on the embodiments of the present disclosure, all other embodiments derived by a person of ordinary skill in the art without creative efforts shall fall within the protection scope of the present disclosure.

In related arts, a backlight driving circuit mainly comprises an external power source, a power source sub-circuit, and a plurality of lamp bars of LEDs; and each lamp bar of LEDs comprises a plurality of LEDs. The external power source supplies an external voltage to the power source sub-circuit. The power source sub-circuit converts the external voltage into a voltage required by the plurality of lamp bars of LEDs, and supplies the converted voltage to each lamp bar of LEDs. All the LEDs in the same lamp bar of LEDs are turned on or off simultaneously. As a result, in a displayed image, a region that should be brighter is dark or a region that should be darker is bright, causing poorer fineness and definition of the displayed image by an LCD panel.

A backlight driving circuit according to an embodiment of the present disclosure includes a switch control sub-circuit. The switch control sub-circuit can control each of LEDs to be turned on or off separately under the action of a voltage output by a power source sub-circuit. In this way, in an image displayed by a panel, a region that should be bright is bright, and a region that should be dark is dark, so that the displayed image has better fineness and definition.

Figure 1:
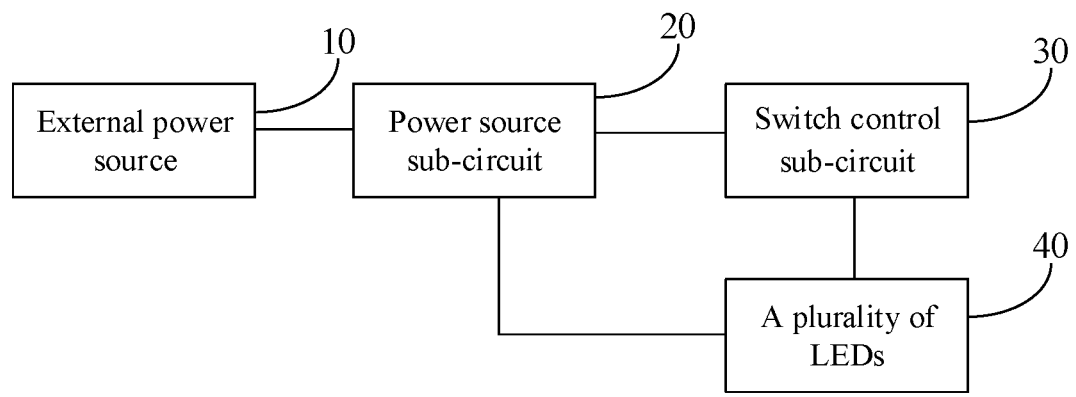
FIG. 1 is a schematic structural diagram of a backlight driving circuit according to an embodiment of the present disclosure.

Embodiments of the present disclosure provide a backlight driving circuit. As illustrated in FIG. 1, the backlight driving circuit is configured to drive a backlight source. The backlight source comprises a plurality of LEDs 40 arranged in an array. The backlight driving circuit comprises a power source sub-circuit 20 and a switch control sub-circuit 30.

The power source sub-circuit 20 is electrically connected to the plurality of LEDs 40 respectively through the switch control sub-circuit 30. The switch control sub-circuit 30 is configured to control each of the LEDs to be turned on or off separately under effect of a voltage output by the power source sub-circuit 20.

Here, the switch control sub-circuit 30 under effect of the voltage output by the power source sub-circuit 20 refers to that the power source sub-circuit 20 supplies the LEDs with electric energy required by the LEDs to emit light through the switch control sub-circuit 30. That is, the switch control sub-circuit 30 controls each of the LEDs to be turned on or off by controlling a connection state between the respective LEDs 40 and the power source sub-circuit 20 separately.

In summary, in the backlight driving circuit according to the embodiment of the present disclosure, the switch control sub-circuit included in the backlight driving circuit is electrically connected to the power source sub-circuit and the respective LEDs. The switch control sub-circuit can control each of LEDs to be turned on or off separately under the effect of the voltage output by the power source sub-circuit. Thus, in an image to be displayed, a region that should be bright is bright and a region that should be dark is dark, so that fineness and definition of the image to be displayed are improved.

As illustrated in FIG. 1, the power source sub-circuit 20 is electrically connected to an external power source 10. The external power source 10 is configured to provide an external voltage to the power source sub-circuit 20 electrically connected to the plurality of LEDs 40.

Figure 2A:
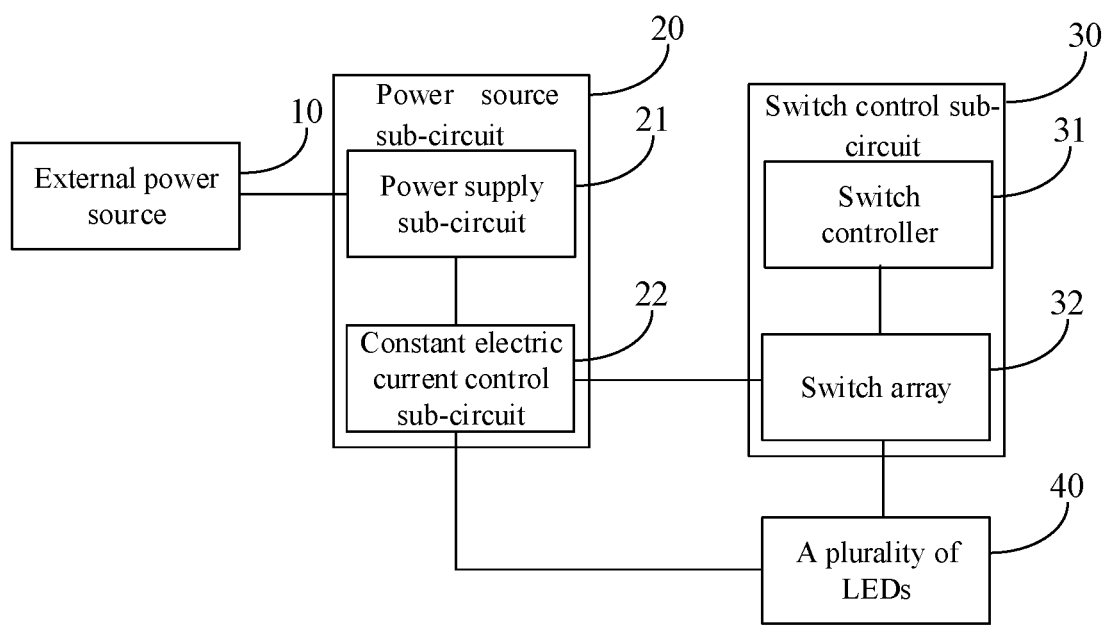
FIG. 2A is a schematic structural diagram of a backlight driving circuit according to another embodiment of the present disclosure.

Optionally, as illustrated in FIG. 2A, the switch control sub-circuit 30 can include a switch controller 31 and a switch array 32.

Figure 2B:
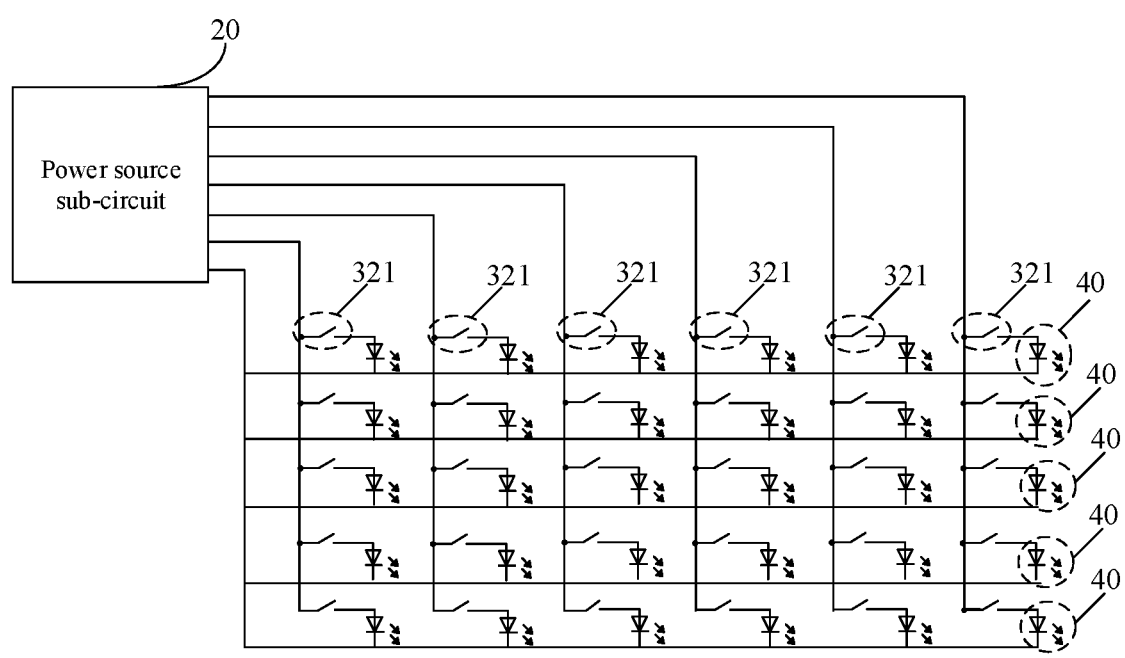
FIG. 2B is a schematic connection diagram of a switch array and LEDs according to an embodiment of the present disclosure.

As illustrated in FIG. 2B, the switch array includes a plurality of switches 321 corresponding to the plurality of LEDs one by one. One end of each of the switches 321 is electrically connected to a positive electrode of the power source sub-circuit 20, and the other end of the switch 321 is electrically connected to a positive electrode of the LED 40 that the switch 321 corresponds to. A negative electrode of each of the LEDs 40 is electrically connected to a negative electrode of the power source sub-circuit 20.

The switch controller 31 is electrically connected to a control end of each of the switches 321, and is configured to control each switch 321 to be turned on or turned off separately under the effect of the external voltage output by the power source sub-circuit 20 so as to control the LED that corresponds to the switch 321.

Optionally, as illustrated in FIG. 2A, the power source sub-circuit 20 can include a power supply sub-circuit 21 and a constant electric current control sub-circuit 22.

The power supply sub-circuit 21 is configured to convert an external voltage supplied by an external power source 10 into voltages required by the LEDs. Here, the voltages required by the LEDs refer to the voltages required to drive the plurality of LEDs to emit light. A light intensity of the LED is related to the magnitude of the driving electric current thereof as the LED is an electric current driving member.

The constant electric current control sub-circuit 22 is configured to adjust and control the voltages output by the power supply sub-circuit 21 to achieve constant electric current driving of the LEDs. The constant electric current control sub-circuit 22 generates an electric current based on the voltages output by the power supply sub-circuit 21 to perform the constant electric current driving on a turned-on LED 40.

Optionally, the switch control sub-circuit 30 is configured to determine a to-be-turned-on LED 40 and a to-be-turned-off LED 40 according to color information of an image to be displayed, and control each of the LEDs 40 to be turned on or off according to the determined to-be-turned-on LED 40 and to-be-turned-off LED 40.

Here, the image to be displayed refers to an image to be displayed on a display panel corresponding to the backlight source driven according to the backlight driving method in the present disclosure. The color information of the image to be displayed may be acquired through an external instruction.

Exemplarily, when receiving an image display instruction, the switch control sub-circuit 30 may determine the to-be-turned-on LED and the to-be-turned-off LED according to the image display instruction, wherein the image display instruction is configured to indicate the color information of the image to be displayed.

For example, when receiving the image display instruction, the switch control sub-circuit 30 may determine a first region with brightness value no less than a preset brightness value and a second region with brightness value less than the preset brightness value in the image to be displayed according to the image display instruction. Then, all the LEDs are divided into one or more lamp groups according to the first region and the second region. Each lamp group includes at least one LED and corresponds to one of the first region and the second region in the image to be displayed. The LEDs in each lamp group are turned on or off simultaneously. If one lamp group corresponds to the first region, the LEDs in the lamp group are turned on simultaneously. If one lamp group corresponds to the second region, the LEDs in the lamp group are turned off simultaneously.

For example, all the LEDs are in a turning-off state at the initial time. Thus, the switch control sub-circuit obtains a plurality of lamp groups according to the first region and the second region, and controls LEDs in the lamp group corresponding to the first region to be turned on while LEDs in the lamp group corresponding to the second region keep their turning-off state. As a result, in the image to be displayed, a region that should be bright is bright, and a region that should be dark is dark.

Figure 3:
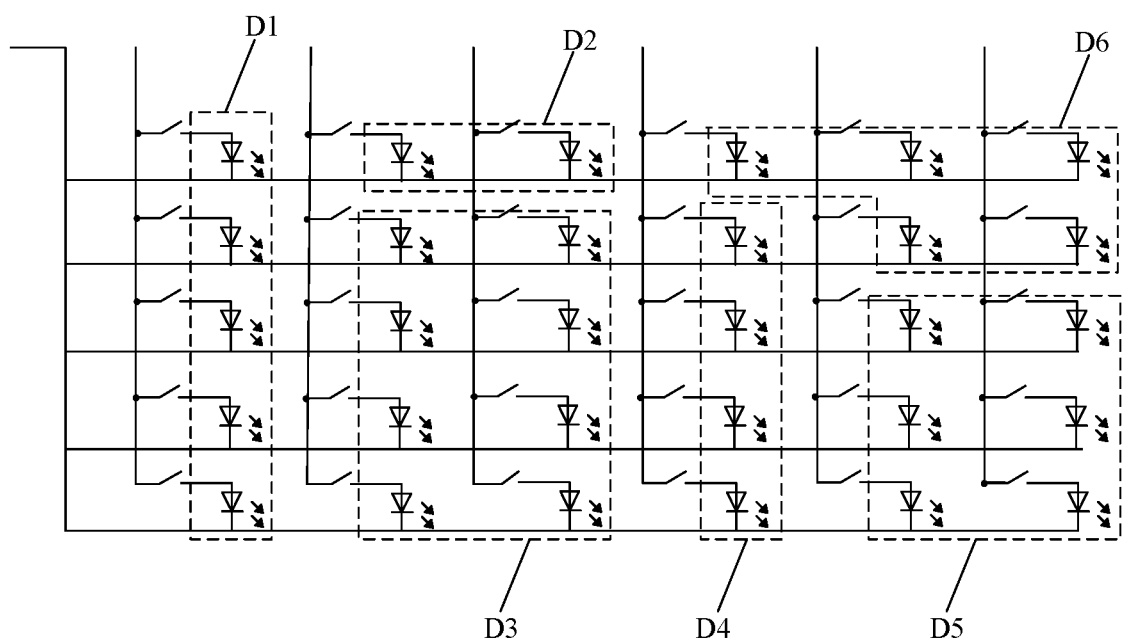
FIG. 3 is a schematic diagram of a plurality of lamp groups determined by a switch control sub-circuit according to an embodiment of the present disclosure.

Exemplarily, as illustrated in FIG. 3, the switch control sub-circuit divides all the LEDs into six lamp groups according to the determined first region and second region of the image to be displayed. The six lamp groups are D1, D2, and D3, D4, D5, and D6, wherein D1, D3, and D6 correspond to the first region in the image to be displayed, and D2, D4, and D5 correspond to the second region in the image to be displayed. In this way, the switch control sub-circuit can determine that the LEDs in D1, D3, and D6 are turned on, and the LEDs in D2, D4, and D5 are turned off.

In the present embodiment, each LED may correspond to one region. Each first region or each second region consists of at least one region. When the first region or the second region includes a plurality of regions, the plurality of regions are connected to each other.

The first region with brightness value no less than the preset brightness value in the image to be displayed means that the brightness value of each region included in the first region is no less than the preset brightness value. The second region with brightness value less than the preset brightness value in the image to be displayed means that the brightness value of each of the regions included in the second region is less than the preset brightness value.

Here, the brightness value of each region may be an average value of brightness values of all pixels of the region. In other implementations, the brightness value of each region may further be the maximum, minimum, or intermediate value in the brightness values of all the pixels of the region. When different values are adopted to represent the brightness value of the region, the above preset brightness value can also be adjusted accordingly to meet a final display requirement.

Optionally, the image to be displayed may be a dynamic image including a continuous multi-frame image. At this time, the switch control sub-circuit 30 can control the turning on and off of the LEDs once in a display time period of the continuous multi-frame image.

Optionally, when the image to be displayed is a dynamic image, the switch control sub-circuit 30 is further configured to determine a light emission quantity of the to-be-turned-on LED 40 in the display time period of the continuous multi-frame image according to color information of the continuous multi-frame image, and control the to-be-turned-on LED 40 to emit light according to the light emission quantity. That is, when the image to be displayed is the dynamic image, the switch control sub-circuit 30 can control the light emission quantity of the LED 40 in addition to the turning on and off of the LED, thereby further improving a dynamic display effect of the image.

The light emission quantity in the display time period of the continuous multi-frame image refers to the sum of the quantities of light emitted by the LED 40 in this display time period.

When the image to be displayed is a dynamic image, the switch control sub-circuit 30 is configured to determine a turning-on duration of the to-be-turned-on LED and a turning-off duration of the to-be-turned-off LED according to the color information of the continuous multi-frame image, and control the LEDs according to the determined durations, the turning-on duration being configured to define the light emission quantity of the to-be-turned-on LED 40 in the display time period of the continuous multi-frame image. For the dynamic image, the color information of the image varies with time. Thus, when the image to be displayed is the dynamic image, according to the color information of the image to be displayed, the switch control sub-circuit can determine not only LEDs required to be turned on and LEDs required to be turned off but also the turning-on duration of the LEDs required to be turned on and the turning-off duration of the LEDs required to be turned off, so that the dynamic display effect of the image to be displayed is achieved, thereby improving the flexibility of displaying the image.

As an implementation, the switch control sub-circuit 30 is configured to determine a brightness value of each region in the continuous multi-frame image according to the color information of the continuous multi-frame image, each of the regions corresponding to at least one of the LEDs 40; and determine a turning-on duration of the LED 40 corresponding to each region according to a relationship between a brightness value of each region and turning-on durations of the LED.

Here, the brightness value of each region in the continuous multi-frame image may be an average value of brightness values of the region in the multi-frame image. In other implementations, the brightness value of each region in the continuous multi-frame image may also be the maximum, minimum, or intermediate value in the brightness values of the region in the multi-frame image.

For example, in the relationship between the brightness value of region and the turning-on durations of the LED, the region brightness values can be classified into a first brightness range, a second brightness range, a third brightness range, and etc., which are consecutive. The critical points between the first brightness range and the second brightness range are the above preset brightness value. When the brightness value of a region is in the first brightness range, the turning-on duration of the LED corresponding to the region is 0. That is, the LED is not turned on. The larger the maximum or minimum value of the brightness range where the brightness value of the region is located is, the longer the turning-on duration of the LED corresponding to the region is. The maximum turning-on duration of the LED is equal to a lasting time of the multi-frame image.

In this implementation, by controlling the turning-on duration of the LED, in the backlight of the panel, not only are a bright region and a dark region displayed, but also the brightness levels are distinguished, so that finer backlight control is achieved, enabling the displayed image to be higher in fineness and definition.

When the image to be displayed is a dynamic image, in addition to controlling the turning-on duration of each LED, the fine backlight control can also be achieved by the manner as follows.

The power source sub-circuit 20 is configured to provide electric currents of different magnitudes in time division manner in the display time period of the continuous multi-frame image. For example, the power source sub-circuit 20 may include a plurality of electric current channels, each of which provides a different electric current. These electric current channels work in time division in a serial manner. That is, within a time period, the power source sub-circuit 20 outputs the electric currents through each of the electric current channels sequentially.

The switch control sub-circuit 30 is configured to determine an electric current used in turning on of the to-be-turned-on LED 40 according to the color information of the continuous multi-frame image, the current used in turning on being configured to define the light emission quantity of the to-be-turned-on LED 40 in the display time period of the continuous multi-frame image; and control the LED 40 that uses an electric current corresponding to the determined electric current in a magnitude during turning on to be turned on when the power source sub-circuit 20 outputs the electric currents of the different magnitudes.

As an implementation, the switch control sub-circuit 30 is configured to determine a brightness value of each region in the continuous multi-frame image according to the color information of the image to be displayed, each region corresponding to at least one LED 40; and determine a turning-on current of the LED 40 corresponding to each region according to a relationship between region brightness values and turning-on currents of the LEDs.

For example, the region brightness values can be divided into a first brightness range, a second brightness range, a third brightness range, etc., which are consecutive. The critical points between the first brightness range and the second brightness range are the above preset brightness value. In the relationship between the brightness value of region and the turning-on currents of the LED, there is no turning-on current corresponding to the first brightness range but only the turning-on currents corresponding to the second and third brightness ranges as the LED is not turned on in the first brightness range. The larger the maximum or minimum value of the brightness range where the brightness value of a region is located is, the greater the turning-on current of the LED corresponding to the region is.

In addition, in this implementation, as the image to be displayed is a dynamic image, the dynamic image corresponds to a display duration of the continuous multi-frame image. The duration is sufficiently long compared to the duration of one frame of image, so that the time division driving of the electric currents is facilitated. Of course, in other implementations, the above electric current time division driving solution can also be applicable to one frame of image.

For controlling the light emission quantity of the LED, the present disclosure provides two implementations which may be used separately or in combination.

Exemplarily, the color information of the image to be displayed includes a color value of each pixel in the image to be displayed. That is, upon receiving the image display instruction, the switch control sub-circuit can determine a to-be-turned-on LED and a to-be-turned-off LED according to the color value of each pixel in the image to be displayed.

Optionally, the switch control sub-circuit may further be configured to determine a luminance value of each to-be-turned-on LED according to the color value of each pixel in the image to be displayed upon receiving the image display instruction, and turn on the LED according to the determined luminance value. In this way, the fineness of the image to be displayed can be further improved, thereby improving the definition of the image.

Optionally, the switch controller may be a microcontroller unit (MCU). There may be multiple types of switches in the above switch array. Exemplarily, the switch may be a transistor, such as field-effect transistors (for example, metal-oxide-semiconductor field-effect transistors (MOSFETs)). In addition, the switch may further be a digital gate circuit, or may be a field-programmable gate array (FPGA), etc. The switch in the embodiment of the present disclosure may be a separate switching device or a switching device which is composed of a plurality of circuit elements and has a switching function. The backlight driving circuit according to the embodiment of the present disclosure is based on programmable logic technology, and controls each LED to be turned on or off separately, so that the backlight driving process is more suitable for a high-dynamic range (HDR) application scenario, and local backlight brightness adjustment is achieved. In addition, the backlight driving circuit is low in design cost, simple in structure, and easy to implement.

In summary, in the backlight driving circuit according to the embodiment of the present disclosure, the switch control sub-circuit included in the backlight driving circuit is electrically connected to the power source sub-circuit and the plurality of LEDs, respectively. The switch control sub-circuit can control each of the LEDs to be turned on or off separately under the effect of the external voltage output by the power source sub-circuit. Thus, in the image to be displayed, a region that should be bright is bright, and a region should be dark is dark, so that fineness and definition of the image to be displayed are improved.

Embodiments of the present disclosure further provides a display device including the above backlight driving circuit which may be as illustrated in FIG. 1 or FIG. 2A.

Figure 4:
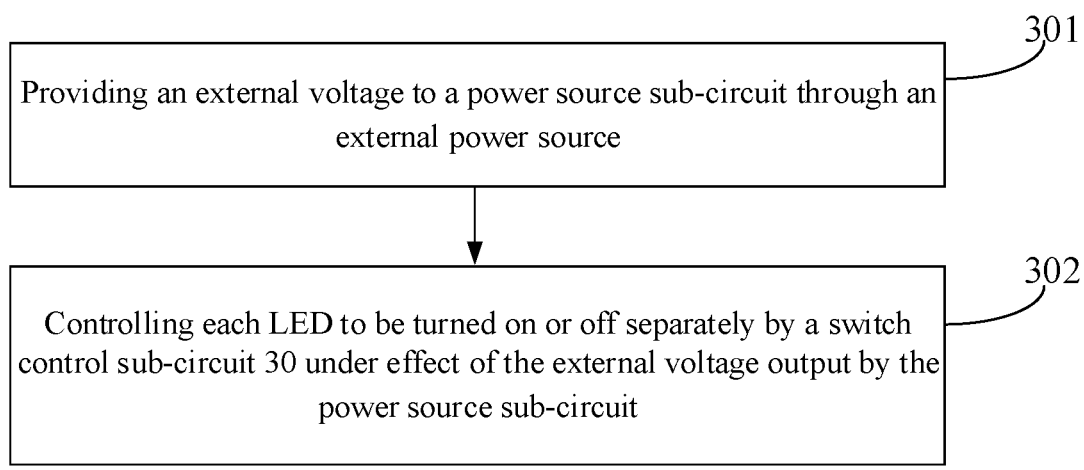
FIG. 4 is a flow chart of a backlight driving method according to an embodiment of the present disclosure.

FIG. 4 is a flow chart of a backlight driving method according to an embodiment of the present disclosure. The backlight driving method is applicable to the backlight driving circuit as illustrated in any one of FIGS. 1-3. Referring to FIG. 4, the method includes the following steps.

In step 301, an external voltage is provided to a power source sub-circuit through an external power source.

Referring to FIG. 1, the external power source 10 is electrically connected to the power source sub-circuit 20; and the power source sub-circuit 20 is electrically connected to a plurality of LEDs 40.

In step 302, each LED is controlled to be turned on or off separately by a switch control sub-circuit 30 under effect of the external voltage output by the power source sub-circuit.

In summary, in the backlight driving method according to the embodiment of the present disclosure, each LED is controlled to be turned on or off separately by the switch control sub-circuit under the effect of the external voltage output by the power source sub-circuit. Thus, in an image to be displayed, a region that should be bright is bright, and a region that is dark is dark, so that fineness and definition of the image to be displayed are improved.

Figure 5:
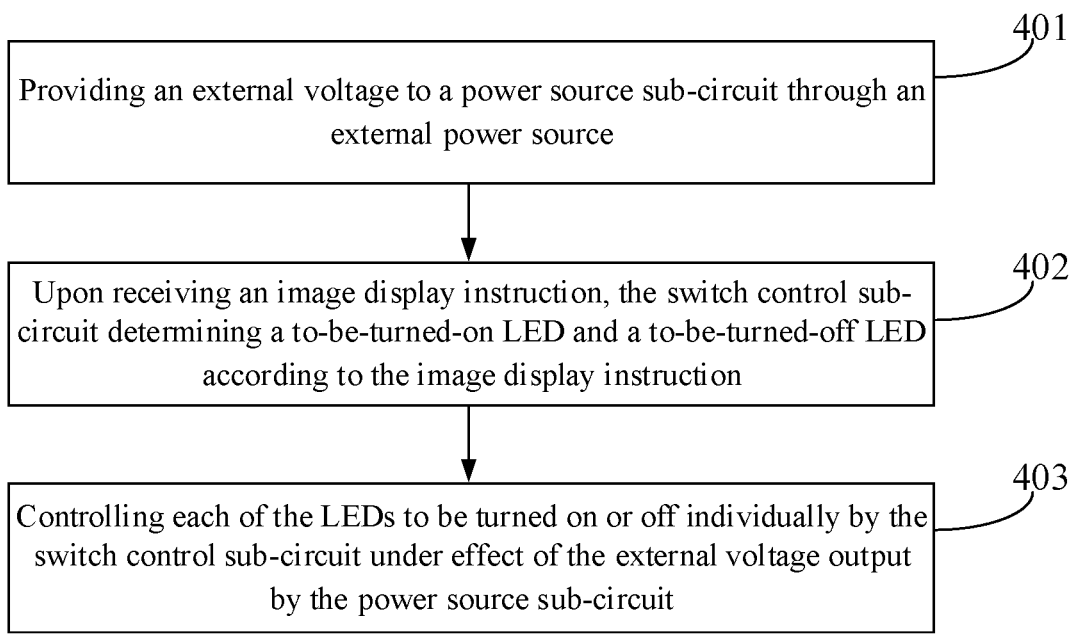
FIG. 5 is a flow chart of a backlight driving method according to another embodiment of the present disclosure.

FIG. 5 is a flow chart of a backlight driving method according to another embodiment of the present disclosure. The backlight driving method is applicable to the backlight driving circuit as illustrated in any one of FIGS. 1-3. Referring to FIG. 5, the method includes the following steps.

In step 401, an external voltage is provided to a power source sub-circuit through an external power source.

Referring to FIG. 2A, the external power source 10 is electrically connected to the power source sub-circuit 20; and the power source sub-circuit 20 is electrically connected to a plurality of LEDs 40.

In step 402, upon receiving an image display instruction, the switch control sub-circuit determines a to-be-turned-on LED and a to-be-turned-off LED according to the image display instruction.

The image display instruction is configured to indicate color information of an image to be displayed.

Optionally, step 402 can include: when receiving the image display instruction, the switch control sub-circuit determines a first region with brightness value no less than a preset brightness value and a second region with brightness value less than the preset brightness value in the image to be displayed according to the image display instruction. Then, all the LEDs are divided into one or more lamp groups according to the first region and the second region. Each lamp group includes at least one LED and corresponds to one of the first region and the second region in the image to be displayed. The LEDs in each lamp group are turned on or off simultaneously. If one lamp group corresponds to the first region, the LEDs in the lamp group are turned on simultaneously. If one lamp group corresponds to the second region, the LEDs in the lamp group are turned off simultaneously.

Optionally, the image to be displayed may be a dynamic image. When the image to be displayed is a dynamic image, step 402 may further include: upon receiving the image display instruction, the switch control sub-circuit determines a turning-on duration of the to-be-turned-on LED and a turning-off duration of the to-be-turned-off LED according to the image display instruction, and controls the LEDs according to the determined durations. Thus, a dynamic display effect of the image to be displayed is achieved, and the flexibility of displaying the image is improved.

Exemplarily, color information of the image to be displayed may include a color value of each pixel in the image to be displayed. Determining the to-be-turned-on LED and the to-be-turned-off LED by the switch control sub-circuit according to the image display instruction may include: determining the to-be-turned-on LED and the to-be-turned-off LED according to a color value of each pixel of the image to be displayed by the switch control sub-circuit.

Exemplarily, the switch control sub-circuit may receive an image display instruction sent by the MCU.

In step 403, each of the LEDs is controlled to be turned on or off separately by the switch control sub-circuit under effect of the external voltage output by the power source sub-circuit.

That is, each LED is controlled to be turned on or off separately by controlling a connection state between the LED 40 and the power source sub-circuit 20 separately by the switch control sub-circuit 30.

Optionally, referring to FIG. 2A, the switch control sub-circuit 30 may include a switch controller 31 and a switch array 32. Referring to FIG. 2B, the switch array may include a plurality of switches 321 corresponding to the plurality of LEDs in one-to-one correspondence. Accordingly, step 403 may include the following sub-step.

Each switch is controlled to be close or open separately by the switch controller under the effect of the external voltage output by the power source sub-circuit so as to control the LED that corresponds to the switch.

Figure 6:
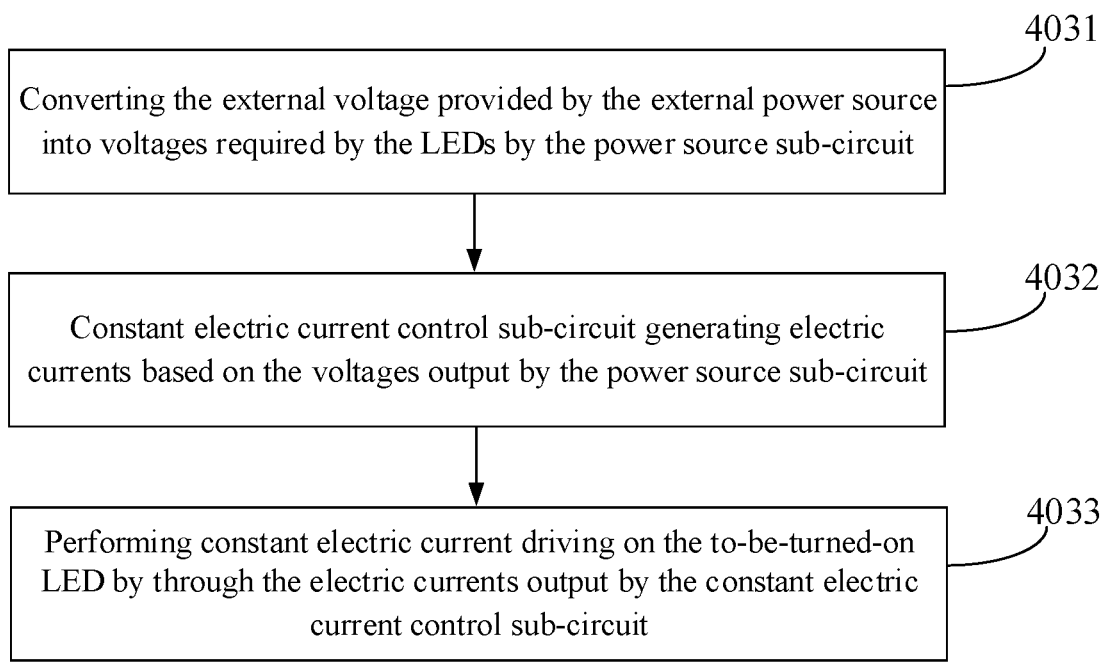
FIG. 6 is a flow chart illustrating that each of the LEDs is controlled to be turned on or off separately through the switch control sub-circuit according to an embodiment of the present disclosure.

Optionally, referring to FIG. 2A, the power source sub-circuit 20 may include a power supply sub-circuit 21 and a constant electric current control sub-circuit 22. Accordingly, as illustrated in FIG. 6, step 403 may include the following sub-steps.

In step 4031, the external voltage provided by the external power source is converted into voltages required by the LEDs by the power source sub-circuit.

In step 4032, electric currents are generated by the constant electric current control sub-circuit based on the voltages output by the power source sub-circuit.

In step 4033, constant electric current driving is performed on the to-be-turned-on LED by through the electric currents output by the constant electric current control sub-circuit.

When the color information of the image to be displayed includes the color value of each pixel in the image to be displayed, controlling the connection state between each LED 40 and the power source sub-circuit 20 separately by the switch control sub-circuit 30 may include: determining a to-be-turned-on LED 40 and a to-be-turned-off LED 40 according to the color information of the image to be displayed, and controlling each of the LEDs 40 to be turned on or off according to the determined to-be-turned-on LED 40 and to-be-turned-off LED 40.

Determining the to-be-turned-on LED 40 and the to-be-turned-off LED 40 according to the color information of the image to be displayed may include: determining a first region with brightness value no less than a preset brightness value and a second region with brightness value less than the preset brightness value in the image to be displayed according to the image display instruction; dividing all the LEDs 40 into one or more lamp groups according to the first region and the second region, each lamp group including at least one LED 40 and corresponding to the first region or the second region in the image to be displayed; when the lamp group corresponds to the first region, controlling the LEDs 40 in the lamp group to be turned on simultaneously; when the lamp group corresponds to the second region, controlling the LEDs 40 in the lamp group to be turned off simultaneously.

Optionally, the backlight driving method according to the embodiment of the present disclosure may further include: determining a luminance value of each to-be-turned-on LED by the switch control sub-circuit upon receiving the image display instruction according to the color value of each pixel in the image to be displayed, and turning on the LED according to the determined luminance value. In this way, the fineness of the image to be displayed is further improved, thereby improving the definition of the image.

Optionally, determining the light emission quantity of the to-be-turned-on LED 40 in the display time period of the continuous multi-frame image according to the color information of the continuous multi-frame image may include the following sub-step:

A turning-on duration of the to-be-turned-on LED 40 is determined according to the color information of the continuous multi-frame image, wherein the turning-on duration is configured to define the light emission quantity of the to-be-turned-on LED 40 in the display time period of the continuous multi-frame image.

Controlling the to-be-turned-on LED 40 to emit light according to the light emission quantity includes the following sub-step.

The to-be-turned-on LED 40 is controlled to be turned on according to the turning-on duration of the LED 40.

Exemplarily, determining the turning-on duration of the to-be-turned-on LED 40 according to the color information of the continuous multi-frame image includes the following sub-step.

A brightness value of each region in the continuous multi-frame image is determined according to the color information of the continuous multi-frame image, wherein each region corresponds to at least one LED 40.

The turning-on duration of the LED 40 corresponding to each region is determined according to a set relationship between a brightness value of region and turning-on durations of the LEDs.

Optionally, the power source sub-circuit 20 is configured to provide electric currents of different magnitudes in time division in the display time period of the continuous multi-frame image. For example, the power source sub-circuit 20 includes a plurality of electric current channels, each of which provides a different electric current output by the electric current channel in time division.

The method further includes: upon receiving the image display instruction, determining an electric current used in turning on of the to-be-turned-on LED 40 according to the color information of the continuous multi-frame image indicated by the image display instruction.

Determining the light emission quantity of the to-be-turned-on LED 40 in the display time period of the continuous multi-frame image according to the color information of the continuous multi-frame image may include the following sub-step.

An electric current used in turning on of the to-be-turned-on LED 40 is determined according to the color information of the continuous multi-frame image, wherein the current used in turning on is configured to define the light emission quantity of the to-be-turned-on LED 40 in the display time period of the continuous multi-frame image.

Controlling the to-be-turned-on LED 40 to emit light according to the light emission quantity includes the following sub-step.

When the power source sub-circuit 20 outputs electric currents of different magnitudes, the LED 40 that uses an electric current corresponding to the determined current in a magnitude during turning on is controlled to be turned on.

Exemplarily, determining the current used in turning on of the to-be-turned-on LED 40 according to the color information of the continuous multi-frame image includes the following sub-steps.

A brightness value of each region in the continuous multi-frame image is determined according to the color information of the image to be displayed, wherein each of the regions corresponds to at least one of the LEDs 40.

The turning-on current of the LED 40 corresponding to each region is determined according to a set relationship between a brightness value of region and a turning-on current of the LEDs.

In summary, in the backlight driving method according to the embodiment of the present disclosure, each of the LEDs is controlled to be turned on or off separately by the switch control sub-circuit under the effect of the external voltage output by the power source sub-circuit. Thus, in the image to be displayed, a region should be bright is bright, and a region should be dark is dark, so that fineness and definition of the image to be displayed are improved.

It should be noted that the order of the steps of the backlight driving method according to the embodiments of the present disclosure can be appropriately adjusted, and the steps of the backlight driving method according to the embodiments of the present disclosure can be increased or decreased accordingly as needed. Change to the methods which can be easily expected by any person skilled in the art should be covered by the protection scope of the present disclosure, and thus will not be elaborated herein.

Figure 7:
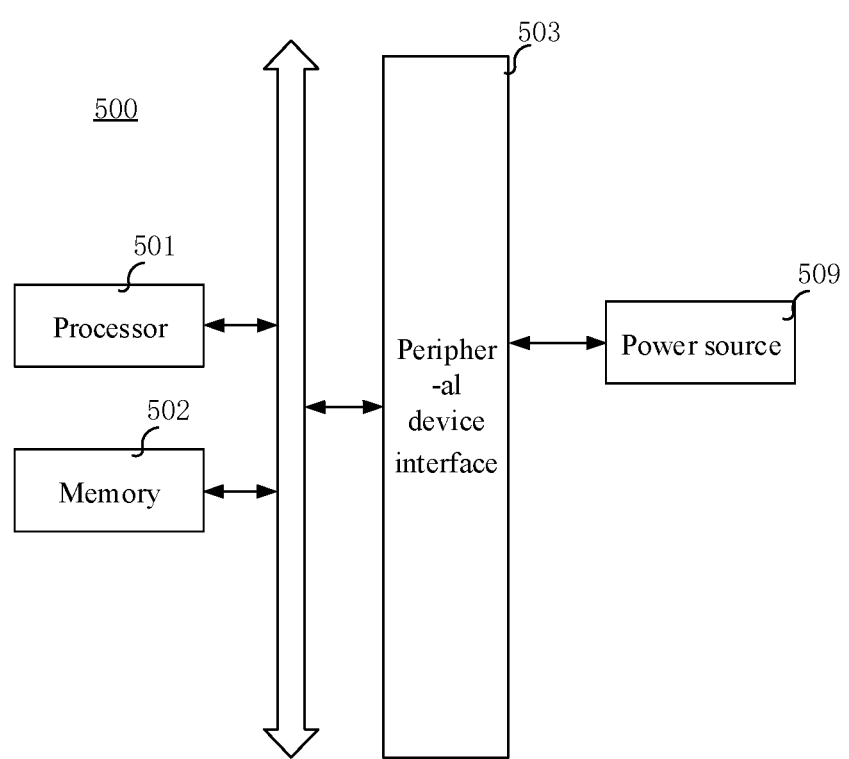
FIG. 7 is a structural block diagram of a backlight driving device according to an embodiment of the present disclosure.

FIG. 7 is a structural block diagram of a backlight driving device 500 according to one embodiment of the present disclosure. The device 500 may include a processor 501 and a memory 502.

The processor 501 may include at least one processing cores, such as a 4-core processor and an 8-core processor. The processor 501 may be formed by at least one hardware of a DSP (Digital Signal Processing), an FPGA (Field-Programmable Gate Array), and a PLA (Programmable Logic Array). The processor 501 may further include a main processor and a coprocessor. The main processor is a processor for processing the data in an awake state, and is also called a CPU (Central Processing Unit). The coprocessor is a low-power-consumption processor for processing the data in a standby state. In some embodiments, the processor 501 may be integrated with a GPU (Graphics Processing Unit), which is configured to render and draw the content that needs to be displayed by a display screen. In some embodiments, the processor 501 may further include an AI (Artificial Intelligence) processor configured to process computational operations related to machine learning.

The memory 502 may include at least one computer-readable storage mediums, which can be non-transitory. The memory 502 may further include a high-speed random-access memory, as well as a non-volatile memory, such as at least one disk storage devices and flash storage devices. In some embodiments, the non-transitory computer-readable storage medium in the memory 502 is configured to store at least one instruction. The at least one instruction is configured to be executed by the processor 501 to implement the backlight driving method according to the backlight driving method according to the embodiments of the present disclosure.

In some embodiments, the device 500 further optionally includes a peripheral device interface 503 and at least one peripheral device. The processor 501, the memory 502, and the peripheral device interface 503 may be connected through a bus or a signal line. Each peripheral device may be connected to the peripheral device interface 503 through a bus, a signal line or a circuit board. For example, the peripheral device may include a power source 509 for supplying power to the respective components of the device 500.

It will be understood by those skilled in the art that the structure illustrated in FIG. 7 cannot be construed as a limitation to the device 500, and may include more or less components than those illustrated, or combine some components or adopt different component arrangements.

In exemplary embodiments, a non-transitory computer-readable storage medium including instructions is also provided, such as the memory including instructions, executable by the processor in the apparatus, for performing the above-described methods. For example, the non-transitory computer-readable storage medium may be a ROM, a RAM, a CD-ROM, a magnetic tape, a floppy disc, an optical data storage device, and the like.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as exemplary only, with a true scope and spirit of the present disclosure is indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A backlight driving circuit of driving a backlight source, the backlight source comprising a plurality of LEDs arranged in an array, the backlight driving circuit comprising: a power source sub-circuit and a switch control sub-circuit, wherein the power source sub-circuit is electrically connected to the plurality of LEDs respectively through the switch control sub-circuit; and the switch control sub-circuit is configured to determine a to-be-turned-on LED and a to-be-turned-off LED according to color information of an image to be displayed, and control each of the LEDs to be turned on or off by controlling a connection state between each of the LEDs and the power source sub-circuit separately according to the determined to-be-turned-on LED and the determined to-be-turned-off LED; and wherein the switch control sub-circuit is configured to determine a first region with brightness value no less than a preset brightness value and a second region with brightness value less than the preset brightness value in the image to be displayed according to the color information of the image to be displayed; all the LEDs are divided into at least one lamp groups according to the first region and the second region, and each lamp group comprises at least one LED and corresponds to one of the first region and the second region in the image to be displayed; when the lamp group corresponds to the first region, the switch control sub-circuit is configured to turn on the LEDs in the lamp group simultaneously; and when the lamp group corresponds to the second region, the switch control sub-circuit is configured to turn off the LEDs in the lamp group simultaneously.

2. The backlight driving circuit of claim 1, wherein the image to be displayed is a dynamic image comprising a continuous multi-frame image; and the switch control sub-circuit is further configured to determine a light emission quantity of the to-be-turned-on LED in a display time period of the continuous multi-frame image according to color information of the continuous multi-frame image, and control the to-be-turned-on LED to emit light according to the light emission quantity.

3. The backlight driving circuit of claim 2, wherein the switch control sub-circuit is configured to determine a turning-on duration of the to-be-turned-on LED according to the color information of the continuous multi-frame image, the turning-on duration being configured to define the light emission quantity of the to-be-turned-on LED in the display time period of the continuous multi-frame image; and control the to-be-turned-on LED to be turned on according to the turning-on duration of the LED.

4. The backlight driving circuit of claim 3, wherein the switch control sub-circuit is configured to determine a brightness value of each region in the continuous multi-frame image according to the color information of the continuous multi-frame image, each region being corresponding to at least one of the LEDs; and determine a turning-on duration of the LED corresponding to each region according to a set relationship between a brightness value of region and a turning-on duration of the at least one of LEDs.

5. The backlight driving circuit of claim 2, wherein the power source sub-circuit is configured to provide electric currents of different magnitudes in time division in the display time period of the continuous multi-frame image; and the switch control sub-circuit is configured to determine an electric current used in turning on of the to-be-turned-on LED according to the color information of the continuous multi-frame image, the electric current used in turning on being configured to define the light emission quantity of the to-be-turned-on LED in the display time period of the continuous multi-frame image; and control the LED that uses an electric current corresponding to the determined electric current in a magnitude during turning on to be turned on when the power source sub-circuit outputs the electric currents of the different magnitudes.

6. The backlight driving circuit of claim 5, wherein the switch control sub-circuit is configured to determine a brightness value of each region in the continuous multi-frame image according to the color information of the image to be displayed, each region corresponding to at least one of the LEDs; and determine a turning-on electric current of the LED corresponding to each region according to a set relationship between a brightness value of region and a turning-on electric current of the at least one of LEDs.

7. The backlight driving circuit of claim 1, wherein the switch control sub-circuit comprises a switch controller and a switch array;

the switch array comprises a plurality of switches corresponding to the plurality of LEDs in one-to-one correspondence; one end of each of the plurality of switches is electrically connected to a positive electrode of the power source sub-circuit, the other end of the switch is electrically connected to a positive electrode of the LED that the switch corresponds to, and a negative electrode of each of the LEDs is electrically connected to a negative electrode of the power source sub-circuit; and the switch controller is configured to be electrically connected to a control end of each of the switches, respectively.

8. A display device, comprising a backlight driving circuit configured to drive a backlight source, the backlight source comprising a plurality of LEDs arranged in an array, the backlight driving circuit comprising:

a power source sub-circuit and a switch control sub-circuit, wherein the power source sub-circuit is electrically connected to the plurality of LEDs respectively through the switch control sub-circuit; and the switch control sub-circuit is configured to determine a to-be-turned-on LED and a to-be-turned-off LED according to color information of an image to be displayed, and control each of the LEDs to be turned on or off by controlling a connection state between each of the LEDs and the power source sub-circuit separately according to the determined to-be-turned-on LED and the determined to-be-turned-off LED; and wherein the switch control sub-circuit is configured to determine a first region with brightness value no less than a preset brightness value and a second region with brightness value less than the preset brightness value in the image to be displayed according to the color information of the image to be displayed; all the LEDs are divided into at least one lamp groups according to the first region and the second region, and each lamp group comprises at least one LED and corresponds to one of the first region and the second region in the image to be displayed; when the lamp group corresponds to the first region, the switch control sub-circuit is configured to turn on the LEDs in the lamp group simultaneously; and when the lamp group corresponds to the second region, the switch control sub-circuit is configured to turn off the LEDs in the lamp group simultaneously.

9. A backlight driving method of driving a backlight source comprising a plurality of LEDs arranged in an array, wherein the backlight driving method is implemented based on a backlight driving circuit comprising a power source sub-circuit and a switch control sub-circuit; the power source sub-circuit is electrically connected to the plurality of LEDs respectively through the switch control sub-circuit; and the backlight driving method comprises:

determining a to-be-turned-on LED and a to-be-turned-off LED according to color information of an image to be displayed;

according to the determined to-be-turned-on LED and the determined to-be-turned-off LED, controlling each of the LEDs to be turned on or off by controlling a connection state between the LED and the power source sub-circuit separately by the switch control sub-circuit; and wherein determining the to-be-turned-on LED and the to-be-turned-off LED according to the color information of the image to be displayed comprises:

determining a first region with brightness value no less than a preset brightness value and a second region with brightness value less than the preset brightness value in the image to be displayed according to the color information of the image to be displayed;

dividing all the LEDs into at least one lamp groups according to the first region and the second region, each lamp group comprising at least one LED and corresponding to one of the first region and the second region in the image to be displayed; and when the lamp group corresponds to the first region, controlling the LEDs in the lamp group to be turned on simultaneously, and when the lamp group corresponds to the second region, controlling the LEDs in the lamp group to be turned off simultaneously.

10. The method of claim 9, wherein the image to be displayed is a dynamic image comprising a continuous multi-frame image; and the method further comprises:

determining a light emission quantity of the to-be-turned-on LED in a display time period of the continuous multi-frame image according to color information of the continuous multi-frame image, and controlling the to-be-turned-on LED to emit light according to the light emission quantity.

11. The method of claim 10, wherein determining the light emission quantity of the to-be-turned-on LED in the display time period of the continuous multi-frame image according to the color information of the continuous multi-frame image comprises:

determining a turning-on duration of the to-be-turned-on LED according to the color information of the continuous multi-frame image, the turning-on duration being configured to define the light emission quantity of the to-be-turned-on LED in the display time period of the continuous multi-frame image; and controlling the to-be-turned-on LED to emit light according to the light emission quantity comprises:

controlling the to-be-turned-on LED to be turned on according to the turning-on duration of the LED.

12. The method of claim 11, determining the turning-on duration of the to-be-turned-on LED according to the color information of the continuous multi-frame image comprises:

determining a brightness value of each region in the continuous multi-frame image according to the color information of the continuous multi-frame image, each region corresponding to at least one of the LEDs; and determining a turning-on duration of the LED corresponding to each region according to a set relationship between region a brightness value of region and a turning-on duration of the LEDs.

13. The method of claim 10, wherein the power source sub-circuit is configured to provide electric currents of different magnitudes in time division in the display time period of the continuous multi-frame image;

determining the light emission quantity of the to-be-turned-on LED in the display time period of the continuous multi-frame image according to the color information of the continuous multi-frame image comprises:

determining an electric current used in turning on of the to-be-turned-on LED according to the color information of the continuous multi-frame image, the electric current used in turning on being configured to define the light emission quantity of the to-be-turned-on LED in the display time period of the continuous multi-frame image; and controlling the to-be-turned-on LED to emit light according to the light emission quantity comprises:

controlling the LED that uses an electric current corresponding to the determined electric current in a magnitude during turning on to be turned on when the power source sub-circuit outputs the electric currents of the different magnitudes.

14. The method of claim 13, wherein determining the electric current used in turning on of the to-be-turned-on LED according to the color information of the continuous multi-frame image comprises:

determining a brightness value of each of regions in the continuous multi-frame image according to the color information of the image to be displayed, each of the regions being corresponding to at least one of the LEDs; and determining a turning-on electric current of the LED corresponding to each region according to a set relationship between region brightness values and turning-on electric currents of the LEDs.

15. A backlight driving device comprising: a processor; and a memory configured to store instructions executable by the processor, wherein the processor is configured to perform the backlight driving method of claim 9.

16. A non-transitory computer-readable storage medium, wherein when instructions in the computer-readable storage medium are executed by a processor of a backlight driving device, the backlight driving device is configured to execute the backlight driving method of claim 9.

17. The display device of claim 8, wherein the image to be displayed is a dynamic image comprising a continuous multi-frame image; and > the switch control sub-circuit is further configured to determine a light emission quantity of the to-be-turned-on LED in a display time period of the continuous multi-frame image according to color information of the continuous multi-frame image, and control the to-be-turned-on LED to emit light according to the light emission quantity.

* * * * *